United States Patent Office 3,429,639
Patented Feb. 25, 1969

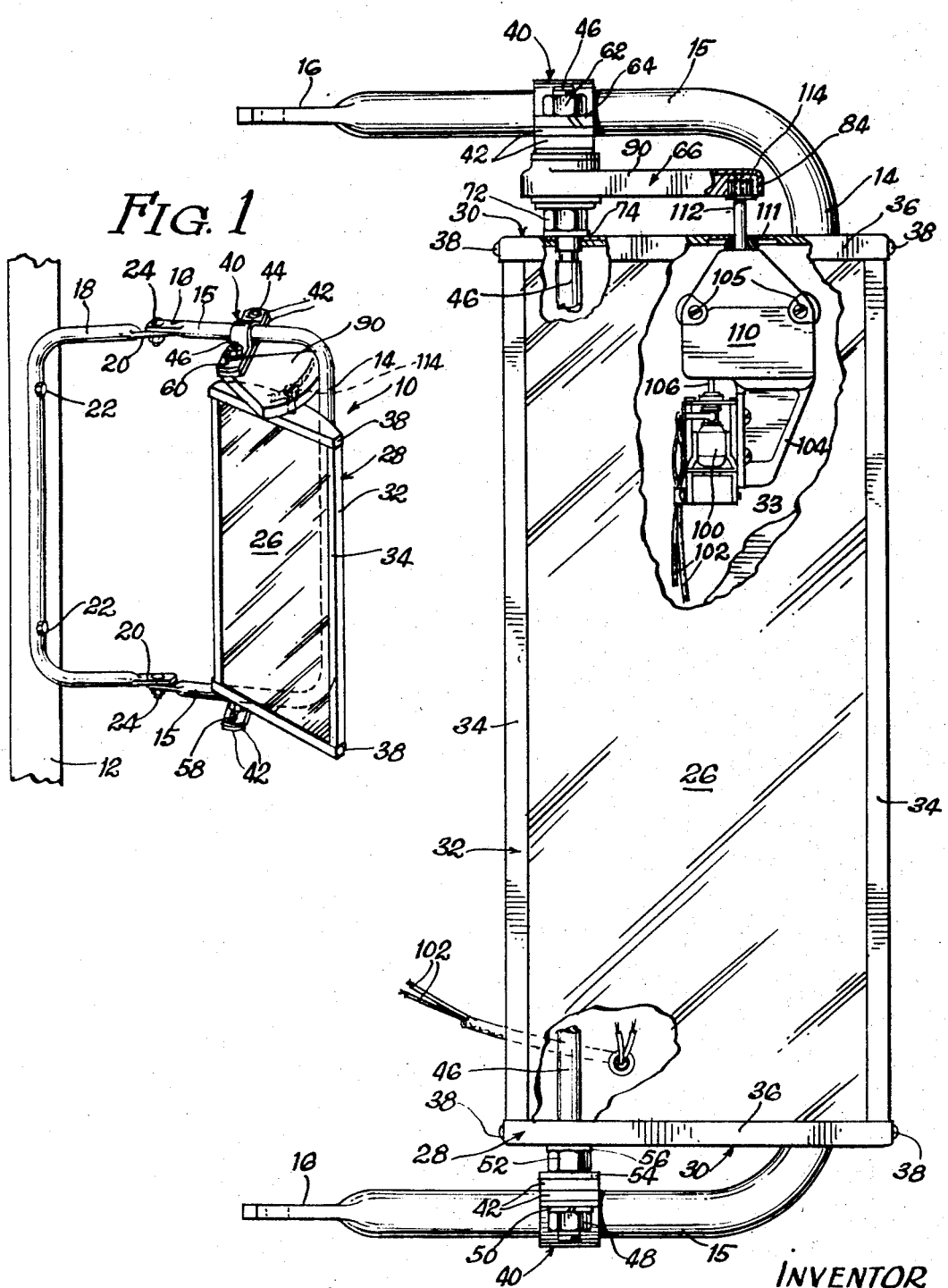

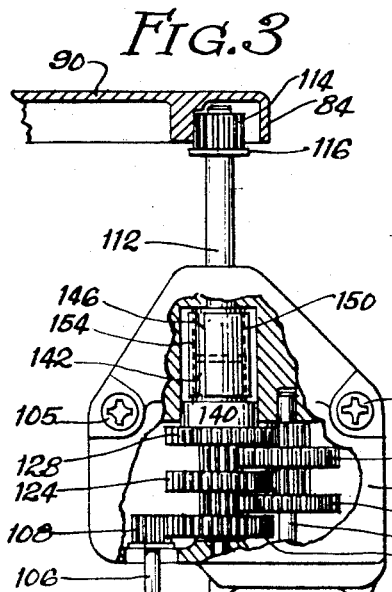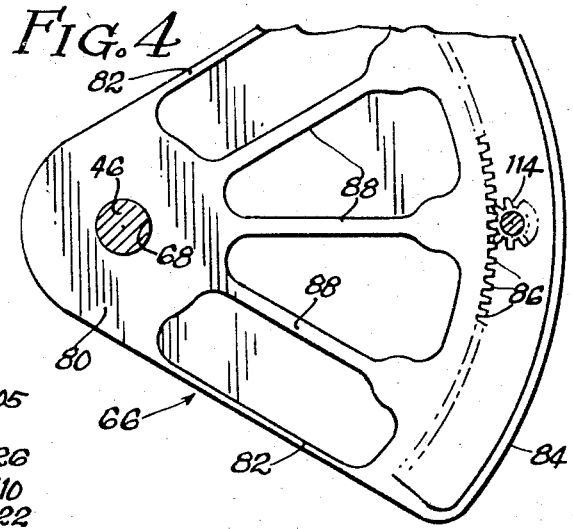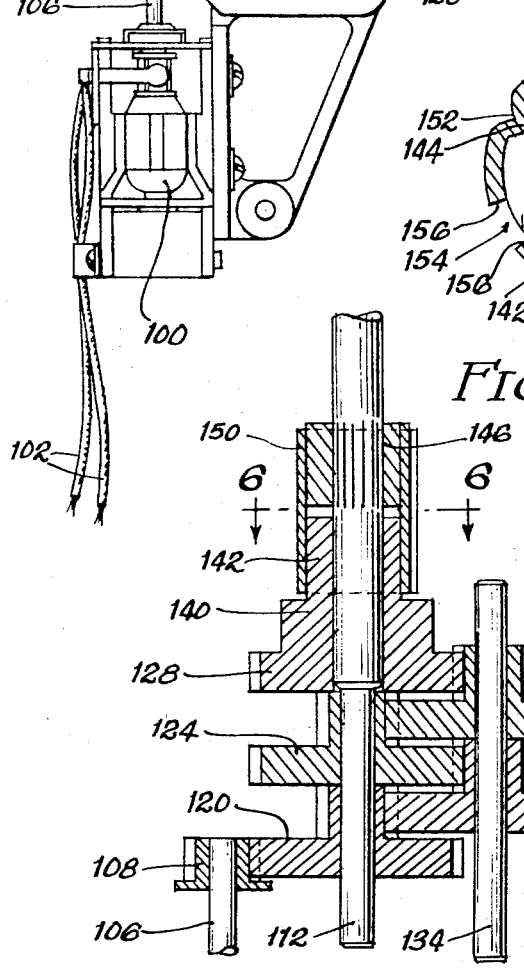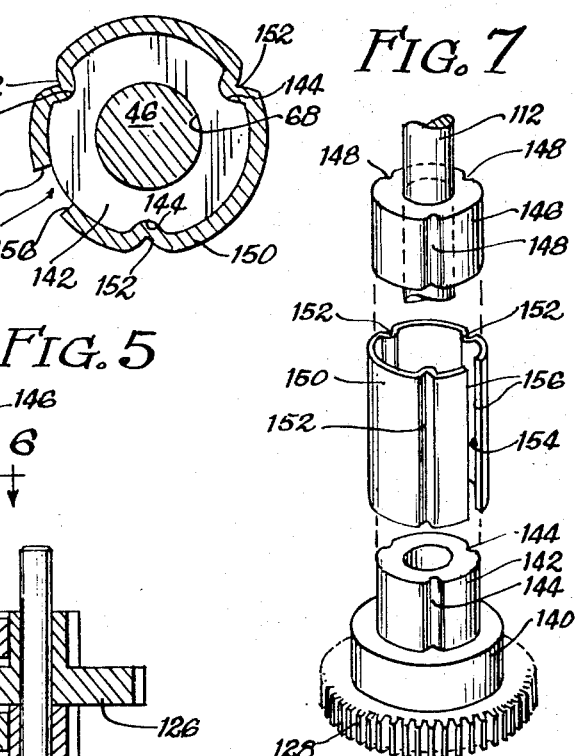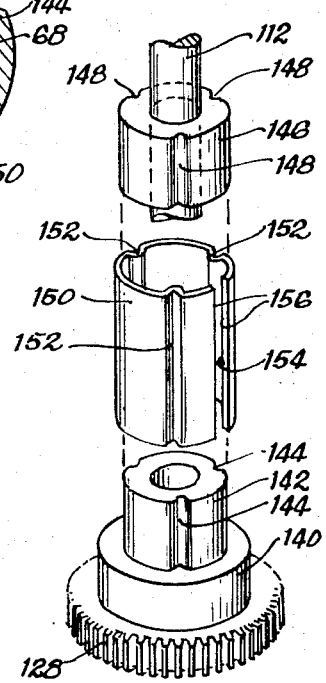

3,429,639
REMOTELY OPERABLE VEHICULAR MIRROR AND COUPLING MECHANISM
John J. Peters, Springfield, Ill., assignor to John Peters Associates, Inc., Springfield, Ill., a corporation of Illinois
Filed Aug. 19, 1965, Ser. No. 481,031
U.S. Cl. 350—289                                4 Claims
Int. Cl. B60r 1/06; G02b 5/08

ABSTRACT OF THE DISCLOSURE

A remotely operable vehicular mirror having a frame attachable to a vehicle and which mounts a housing bearing a mirror. The frame has an axle about which the housing is oscillatably movable and to which is nonrotatably affixed a reference gear segment. A remotely controlled motor is secured internally within the housing and is provided with an output gear in toothed engagement with the reference gear segment for driving the mirror oscillatably to desired positions of viewing.

---

This invention relates to a remotely operable vehicular mirror and to an overload coupling mechanism usable therewith.

In the operation of automotive vehicles such as trucks, a driver should be able to view the road behind the vehicle by utilizing a mirror means on one or both sides of the vehicle. The mirror on the right side of the vehicle is too remote from the driver's position to be manually adjusted while the driver is in driving position. On large vehicles such as trucks, the mirror on the left side is ofttimes too distant to be adjusted by the driver while he is in a driving position.

Some automotive vehicles consist of a tractor and a trailer releasably and pivotally connected to the tractor. When vehicles of this type are travelling on a straight road the mirrors may be in a fixed position to view the rear of the vehicle and the road behind the vehicle. When the tractor and trailer are out of alignment, as when the vehicle is to be maneuvered into a parking position or backed toward a loading platform, mirrors in a fixed position do not give the driver the necessary view of the rear of the vehicle. For that reason it is desirable and frequently necessary to have a remotely operable mirror or mirrors which may be repositioned by the driver when he is parking or maneuvering the vehicle in tight spaces while the driver remains in his normal driving position.

It is therefore an object of this invention to provide a remotely operable vehicular mirror which can be adjusted through a wide angle by a driver while in his normal driving position.

It is a further object of this invention to provide a remotely operable vehicular mirror assembly including a mirror which can be adjusted through a wide angle by a driver while in his normal operating position, which mirror has a driving means for moving it through said wide angle and an overload coupling means for said driving means to prevent damage to said driving means if the mirror has been damaged or otherwise rendered relatively immovable with respect to said driving means.

Yet another object of this invention is the provision of a remotely operable vehicular mirror including a mirror having novel driving means for moving said mirror through a wide angle with respect to a driver in his normal driving position and including means for minimizing backlash and resisting undesired movement of the mirror.

Also an object of this invention is the provision of an overload coupling mechanism for a rotatable axle means comprising an axle means, a first coupling means coaxial with and rotatable about the axis of said axle means, a second coupling means coaxial with and rotatable about the axis of said axle means, a coupling sleeve substantially circumscribing said coupling means for releasably coupling said coupling means for corotation of said coupling means, said sleeve being expandable from a first releasable coupling position in which said coupling members are corotatable to a second uncoupled position in which said coupling means are rotatable with respect to each other.

Yet another object of this invention is to provide a remotely operable vehicular mirror assembly including a mirror adjustable through a wide angle by a driver in his normal driving position in which said mirror assembly is provided with driving means for said mirror including axle means, a first coupling means coaxial with and rotatable about the axis of said axle means, a second coupling means coaxial with and rotatable about the axis of said axle means, a coupling sleeve substantially circumscribing said coupling means for releasably coupling said coupling means for corotation of said coupling means, said sleeve being expandable from a first releasable coupling position in which said coupling members are corotatable to a second uncoupled position in which said coupling means are rotatable with respect to each other.

These and other objects are obtained by the present invention which is a vehicular mirror assembly including a mirror which is adjustable remotely by a driver in his normal driving position. The mirror assembly includes a mirror housing having a mirror and a driving means for oscillating said mirror, said driving means being actuable remotely by a driver in his normal driving position. The driving means includes a rotatable gear means powered to drive the mirror to various positions of adjustment about the mirror's axis of oscillation in which the gear means is remote from the axis of said mirror and its axis of rotation is parallel to said mirror axis and intermediate means lying in a plane generally normal to both axes translate rotational movement of said gear means into oscillatory movement of said mirror assembly with negligible backlash. The driving means also desirably includes an overload coupling mechanism for a rotatable output shaft means bearing the gear means. The coupling mechanism of this invention includes a driven coupling segment coaxial with said output shaft means, a second output coupling segment coaxial with said shaft and a coupling sleeve circumscribing and engaging said coupling segments for releasably coupling said coupling segments for corotation, said coupling sleeve being expandable from a first releasable coupling position in which said coupling segments are corotatable to a second uncoupled position when said output coupling segment is overloaded in which said coupling segments are rotatable with respect to each other.

These and other objects and advantages of this invention will become apparent from the following description and drawings of which:

FIGURE 1 is a perspective view of a remotely operable mirror assembly of this invention;

FIG. 2 is an enlarged front elevation, partially cut away, of a portion of FIG. 1;

FIG. 3 is an enlarged partially cut away view of the driving mechanism shown in FIG. 2;

FIG. 4 is an enlarged bottom view of a portion of the driving means of FIGS. 1 to 3;

FIG. 5 is an enlarged sectional view of a portion of FIG. 3;

FIG. 6 is a partial cross-sectional view taken substantially along line 6—6 of FIG. 5; and FIG. 7 is an exploded perspective view of the coupling means of FIG. 3.

Referring now to the drawings and particularly to

FIGS. 1 and 2, a remotely operable vehicular mirror assembly 10 is shown as being securable to a vehicular body such as the door post 12 of a truck. Mirror assembly 10 includes a supporting frame means such as U-shaped bracket 14 having horizontally disposed upper and lower arms 15 with flattened ends 16. U-shaped bracket is secured to door post 12 as by a complementary U-shaped body bracket 18 having flattened ends 20. Body bracket 18 is connected to door post 12 as by bolts 22. Flattened ends 16 and 20 are releasably locked in any one of a number of predeterminable positions by locking means such as nuts and bolts 24.

Mirror assembly 10 also includes a mirror 26 framed by mirror housing 28. Mirror housing 28 comprises end caps 30 and a vertically extending housing member 32 having vertical flanges 34 which overlap the vertical edges of mirror 26. End caps 30 receive the upper and lower ends of housing member 32. In addition to flanges 34, housing member 32 includes vertical side edges and an arcuate vertically extending back 33. End caps 30 include upwardly and downwardly extending flanges 36, respectively, which overlap the upper and lower horizontal edges of mirror 26 and cooperate with flanges 34 to provide a frame for mirror 26. End caps 30 are secured to housing member 32 as by screws 38 which may also assist in locking the mirror 26 in position within mirror housing 28.

Mirror housing 28, hence mirror 26, is secured to U-shaped bracket 14 by axle means and strap clamps 40 in a manner to be described. Strap clamps 40 comprise a pair of strap members 42 proportioned to clampingly receive the horizontally disposed arms 15 of U-shaped bracket 14. As seen in FIG. 1, each pair of strap members 42 is connected by locking means such as nut and bolt 44 on one side of arms 15. Suitable washers and locking washers may be utilized therewith to resist loosening of the locking connection provided by nut and bolt 44. On the other side of the horizontally disposed arms 15 the mirror assembly axle means such as main mirror shaft 46 is provided. Main mirror shaft 46 extends through mirror housing 28 and end caps 30 thereof and at each of its terminal portions is threaded. Substantially all of the main mirror shaft 46 extending outwardly of mirror housing 28 is threaded while that portion of shaft 46 which lies within housing 28 need not be threaded. A nut 48 and locking washer 50 are provided beneath lower strap clamp 40 while above lower strap clamp 40, a nut 52, a washer 54 and a flanged bushing 56 are provided. Nuts, washers and bushings 48, 50, 52, 54 and 56 all circumscribe the lower end of main mirror shaft 46. Flanged bushing 56 is press-fit in end caps 30 to provide a bearing means for mirror shaft 46. As best seen in FIG. 1 lower strap clamp 40 is provided with an elongated slot 58 through which main mirror shaft 46 passes. By tightening nuts 48 and 52 main mirror shaft 46 may be nonrotatably secured to lower strap clamp 40 in any desired position of adjustment with respect to slots 58 thereof. When nuts 48 and 52 are tightened and when nut and bolt 44 of lower strap clamp 40 are tightened, lower strap clamp 40 will be locked or clamped in position with respect to lower arm 15 of bracket 14.

Main mirror shaft 46 is secured in similar manner to upper strap clamp 40. Thus upper strap clamp 40 defines an elongated slot 60 through which the upper end of main mirror shaft 46 passes. An upper nut 62 and lock washer 64 are positioned above upper strap clamp 40. An intermediate driving element such as rack means 66 defining an opening 68 therein to receive main mirror shaft 46 is positioned below upper strap clamp 40. Washers located immediately above and below rack means 66 are also provided and a further nut 72 and a flanged bushing 74 are positioned beneath rack means 66. Flanged bushing 74 is the same in construction and function as flanged bushing 56.

By tightening nuts 62 and 72 the upper end of a main mirror shaft 46 is nonrotatably secured to upper strap clamp 40 and by tightening cooperable nut and bolt 44 upper strap clamp 40 clampingly grips upper arm 15 to position strap clamp 40 at a desired position along upper arm 15. The clamping effect of nuts 62 and 72 also renders rack means 66 nonrotatable with respect to main mirror shaft 46. Nuts 72 and 52 are positioned so that mirror housing 28, hence mirror 26, is substantially immovable axially along main mirror shaft 46. However mirror housing 28 is freely rotatable and oscillatable on main mirror shaft 46 upon the bearing means provided by bushings 56 and 74. By also tightening nuts and bolt 44 of upper strap clamp 40 the effect is to clamp the main mirror shaft 46 to upper arm 15 of bracket 14. By positioning strap clamps 40 along arms 15 and by utilizing slots 58 and 60, main mirror shaft may be positioned exactly vertically or at a wide variety of inclinations to the vertical.

Rack means 66 includes a hub 80 in which opening 68 is provided. Downwardly extending flanges 82 diverging outwardly from hub 80 terminate outwardly in a downwardly extending arcuate flange 84. Inwardly of arcuate flange 84 there are provided vertical gear teeth 86 which are positioned along an arc of a circle having its center at the center of rack means opening 68. Intermediate gear teeth 86 and opening 68 radially extending web means 88 are provided. As seen in FIG. 1, rack means 66 is provided with an upper covering segment 90 which, with diverging flanges 82 and arcuate flange 84, provides a cover for teeth 86 to protect teeth 86 from the elements and to keep them clean and free from dirt and the like.

A suitable driving mechanism for the vehicular mirror assembly 10 includes a reversible motor means, such as reversible electric motor 100. Motor 100 is remotely operable through conductors 102 which may be powered by a battery or other suitable power supply in the vehicle to which assembly 10 is to be connected. When a battery is used it provides a reversible power source for motor 100. As seen in FIG. 2 conductors 102 extend outwardly of mirror housing 28 through an opening therein which may be provided with a sealing gasket (not shown).

Reversible electric motor 100 is mounted on a frame means 104 which supports not only motor 100, but also a transmission train gear box 110. Supporting frame means 104 is secured to mirror housing 28 as by bolts 105 to fix the driving mechanism with respect to mirror housing 28. The openings in mirror housing 28 which receive bolts 105 may be slotted or enlarged to permit adjustment as parts wear. Motor 100 reversibly rotates a drive shaft 106. Drive shaft 106 extends through an opening in gear box 110 and is provided with driving gear 108 positioned within gear box 110. An output axle means such as output shaft 112 extends through a bearing opening in gear box 110 outwardly of gear box 110 and outwardly of mirror housing 28, extending through upper end cap 30 where a sealing gasket 111 is provided. The uppermost end of output shaft 112 is provided with driving means or gear such as a driving pinion 114 coaxial with and corotatably secured to output shaft 112. The axes of main mirror shaft 46 and of output shaft 112 are parallel and spaced from each other. So also is the driving gear or pinion 114 remote from main mirror shaft 46. The intermediate driving means, in this embodiment rack means 66, lies in a plane generally normal to the axes of shafts 46 and 112. Because it is secured to shaft 46 and in operative engagement with pinion 114 it translates the rotational movement of pinion 114 into oscillatory movement of the mirror housing with a minimum of backlash. The teeth of driving pinion 114 are complementary to and engage teeth 86 of rack means 66 to oscillate mirror 26 about main mirror shaft 46 when it is desirable to change the orientation of mirror 26 with respect to the vehicular body to which mirror assembly 10 is connected. Driving pinion 114 includes a lower shoulder 116.

The other end of output shaft 112 is received in suitable bearing means, such as a cylindrical opening in gear box 110 to facilitate free rotation of output shaft 112.

Within gear box 110 additional gear means are provided for transmitting the output of drive shaft 106 to driving pinion 114. These additional gear means comprise a speed-reducing torque-multiplying transmission train and comprise spur gears 120, 122, 124, 126 and gear 128. Spur gears 120, 124 and gear 128 are freely rotatable about output shaft 112. Spur gears 122 and 126 are freely rotatable on idler shaft 134, the terminal ends of which are received in suitable bearing means such as cylindrical openings in gear box 110. Spur gears 122 and 126 are restrained against axial movement along idler shaft 134 by their intermeshing gears 120, 124 and 128.

In an exemplary embodiment of this invention the speed-reducing torque-multiplying gear train just described has a reduction rate in excess of 5,000 which permits the use of an extremely small motor such as a 0.0025 horsepower motor to produce an output torque at output shaft 112 of approximately 125 ounce-inches.

The output shaft 112 of the output shaft means is provided with a first coupling segment which in the illustrative embodiment hereof somprises coupling member 142. Coupling member 142 is integral with gear 128 and intermediate shoulder 140 and is coaxial with and freely rotatably mounted on output shaft 112. Coupling member 142 is provided with releasable coupling means comprising equidistantly spaced grooves 144 parallel to the axis of output shaft 112.

A second coupling segment comprising coupling member 146 coaxial with the output shaft means is also provided. This coupling member 146 is fixed as by a press-fit to output shaft 112 to be corotatable therewith. Second coupling member 146 is also provided with a coupling means comprising grooves 148 which extend parallel to the axis of the output shaft means.

A coupling sleeve 150 substantially circumscribes coupling members 142 and 146. Coupling sleeve 150 is provided with a plurality of axially extending depressions 152 which are spaced and positioned to mate with and to be received within grooves 144 and 148 of coupling members 142 and 146 respectively. Coupling sleeve 150 also defines an axial slot 154. Sleeve 150 is made of spring steel or other suitable resilient material. When depressions 152 of sleeve 150 are positioned within grooves 144 and 148 of coupling members 142 and 146, driving gear 108 will rotate output shaft 112, thereby rotating driving pinion 114 causing driving pinion 114 to move along the teeth 86 of rack means 66 which as stated is fixed with respect to bracket 14 and the vehicular body. In that manner the mirror housing 28, hence mirror 26, will rotate about main mirror shaft 46. By reversing the direction of rotation of driving gear 108, mirror 26 may be rotated clockwise or counterclockwise, hence oscillated about main mirror shaft 46.

When driving pinion 114 reaches the outermost teeth 86 of rack means 66, or when driving pinion 114 is otherwise prevented from rotating, such as by foreign material interfering with its rotation or when some part has become misaligned, the excessive torque required to rotate output shaft 112 will cause the resilient coupling sleeve 150 to expand from its normal releasable coupling position in which it releasably couples coupling members 142 to 146 to a second expanded position in which the confronting walls 156 of slot 154 are spaced further apart, thereby permitting coupling members 142 and 146 to rotate with respect to each other. The overload force to cause expansion will depend upon that desired for the particular application and the grooves, depression and degree of resiliency of the sleeve will be selected with that in mind. The components of the coupling members are desirably lubricated to facilitate their uncoupling when that is necessary. The grooves of one or more of the coupling members in that manner will be disengaged from depressions 152 of sleeve 150 to provide a unique safety or overload mechanism for preventing damage to motor 100. While this coupling mechanism is adapted for use in connection with the remotely operable vehicular mirror of this invention, it may be used in other environments where it is desirable to provide an overload device for uncoupling a driving means from an output means. This coupling mechanism operates equally well in either direction of rotary movement, is automatically actuated during overloading periods, transmits rotary movements with zero backlash and is automatically self-setting as soon as overloading conditions are corrected.

Negligible or zero backlash is highly desirable in externally mounted vehicular mirrors where accurate positioning of the mirror is desirable and where the wind resistance frequently encountered is great. In accordance with this invention backlash is minimized in several ways. The transmission train of the reversible driving means is of such a ratio that the output gear or pinion is not rotatable by manipulation of the output gear itself. To rotate the gear the reversible driving means must be used. Furthermore, and of great significance, is the remote positioning of the driving gear from the mirror housing shaft about which the mirror housing rotates. Where their axes are coincident or in close proximity, slight over or under driving by the driving gear is magnified in the angle through which the mirror moves. However where, as here, their axes are remote and intermediate means are used to translate the reverse rotational movement of the driving gear into oscillatory movement of the mirror housing a slight over or under driving results in a far lesser angle of movement of the mirror housing. Additionally the remote positioning of the driving gear enhances the ability of the mirror housing to resist movement in response to wind loads and the like encountered by vehicles travelling at high rates of speed.

While rack means 66 provides a limited angle of adjustment for mirror 26, rack 66 may be made longer if desired. The effective angle between brackets 14 and 18 may also be varied to position rack means 66 optimally and to make most effective use of a rack means of a lesser length.

The embodiment of the remotely operable vehicular mirror of this invention and of the coupling mechanism of this invention which have been described are intended to be illustrative only. The foregoing specification and drawings will make apparent to those of ordinary skill in the art various modifications which are within the contemplation of this invention.

I claim:
1. A remotely operable vehicular mirror assembly comprising frame means securable to a vehicular body, axle means secured to said frame means, a mirror housing rotatably mounted on said axle means including a mirror co-rotatable with said mirror housing, reference gear means externally of said mirror housing non-rotatably fixed to said axle means, said reference gear means having teeth disposed along an arc of a circle having its center along the axis of said axle means, a remotely operable drive means secured to said mirror housing and positioned internally thereof, a rotatable output shaft driven by said driving means and extending externally through said mirror housing and having its axis parallel to and spaced from the axis of said axle means, and an output gear means externally mounted co-axially with said output shaft, said output gear means being in driving engagement with said reference gear means for driving said output gear means along said reference gear means to rotate said mirror on said axle means with respect to said frame means.

2. The remotely operable vehicular mirror assembly of claim 1 in which said reference gear means is positioned above said mirror housing and in which the reference gear means defines a shielding means for said reference gear teeth.

3. The remotely operable vehicular mirror assembly of claim 1 in which said remotely operable driving means is a reversible motor for oscillating said mirror about the axis of said axle means.

4. A remotely operable vehicular mirror assembly comprising frame means securable to a vehicular body, axle means non-rotatably secured to said frame means, a mirror housing including a mirror co-rotatably mounted on said axle means for oscillatory movement about the axis thereof, reference gear means non-rotatably secured to said axle means externally of said mirror housing and having its center along the axis of said axle means, remotely operable driving means secured internally to said mirror housing and having an output shaft extending outwardly thereof in juxtaposition to said reference gear means, the axes of said axle means and said output shaft being parallel and spaced from each other, said output shaft being non-continuous and provided with a torque releasable coupling means internally of said mirror housing for releasable conjoint rotation of the coaxial portions thereof, said releasable coupling means including a first coupling means corotatably secured to one portion of said output shaft, a second coupling means corotatably secured to the other portion of said output shaft, and a coupling sleeve substantially circumscribing and corotatably interconnecting said first and second coupling means, said coupling sleeve being expandable to disengage said coupling sleeve from corotative engagement with said first and second coupling means at a predetermined torque of said output shaft, and an output gear corotatively mounted on said output shaft externally of said mirror housing and arranged in toothed engagement with said reference gear means for oscillatably rotating said mirror means with respect to said frame means to selected positions of viewing.

References Cited

UNITED STATES PATENTS

| | | | |
|---|---|---|---|
| 1,092,574 | 4/1914 | Jansson | 64—29 |
| 2,628,833 | 2/1953 | Blanton | 74—422 X |
| 2,877,686 | 3/1959 | Foster | 350—289 |
| 3,005,384 | 10/1961 | Baird et al. | 350—289 |
| 3,075,431 | 1/1963 | White | 350—289 |
| 3,132,201 | 5/1964 | Bertell et al. | 350—282 |
| 3,145,257 | 8/1964 | Suga | 350—304 |

DAVID H. RUBIN, *Primary Examiner.*

U.S. Cl. X.R.

64—29